(12) United States Patent
Goto et al.

(10) Patent No.: US 8,918,247 B2
(45) Date of Patent: Dec. 23, 2014

(54) CONTROL DEVICE FOR VEHICLE

(75) Inventors: Miyuki Goto, Kasugai (JP); Manabu Orihashi, Susono (JP); Keiichi Uno, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 178 days.

(21) Appl. No.: 13/375,018

(22) PCT Filed: Mar. 1, 2010

(86) PCT No.: PCT/JP2010/053273
§ 371 (c)(1),
(2), (4) Date: Nov. 29, 2011

(87) PCT Pub. No.: WO2011/108067
PCT Pub. Date: Sep. 9, 2011

(65) Prior Publication Data
US 2013/0020398 A1 Jan. 24, 2013

(51) Int. Cl.
*G06F 7/00* (2006.01)
*B60L 1/00* (2006.01)
(Continued)

(52) U.S. Cl.
CPC ............ *B60L 1/003* (2013.01); *B60H 1/00285* (2013.01); *B60H 1/004* (2013.01); *B60H 1/2218* (2013.01); *B60L 1/02* (2013.01); *B60L 3/0023* (2013.01); *B60L 11/14* (2013.01); *B60N 2/5685* (2013.01); *B60W 10/06* (2013.01); *B60W 10/30* (2013.01); *B60H 2001/2237* (2013.01); *B60H 2001/2253* (2013.01); *B60H 2001/2265* (2013.01); *B60H 2001/2293* (2013.01); *B60L 2240/34* (2013.01); *B60L 2240/36* (2013.01); *B60L 2240/445* (2013.01); *B60W 20/00* (2013.01); *B60W 2510/0676* (2013.01); *Y02T 10/7077* (2013.01)
USPC ............................................. 701/36; 700/300

(58) Field of Classification Search
CPC ................................................... G05D 23/1925
USPC ............................................. 701/36; 700/300
See application file for complete search history.

(56) References Cited

U.S. PATENT DOCUMENTS 6,032,869 A * 3/2000 Ito et al. .................. 237/12.3 B
6,073,456 A 6/2000 Kawai et al.
(Continued)

FOREIGN PATENT DOCUMENTS

EP 1 122 104 A2 8/2001
EP 2 156 971 A1 2/2010
(Continued)

OTHER PUBLICATIONS

International Search Report issued in International Application No. PCT/JP2010/053273 on Jun. 8, 2010 (with translation).
(Continued)

*Primary Examiner* — Calvin Cheung
(74) *Attorney, Agent, or Firm* — Oliff PLC

(57) ABSTRACT

A vehicle is provided with an air conditioning device that heats a passenger compartment, using cooling water passing through an internal combustion engine as a heat source, and a seat heater, which heats a seat in the passenger compartment by using an electric power from a battery as a heat source. An electronic control device performs EV travel of the vehicle by driving a motor generator while setting the internal combustion engine to a stop state and restarts the internal combustion engine when a cooling water temperature becomes equal to or less than a predetermined temperature during the EV travel. When a heating request is output to make the air conditioning device heat the passenger compartment during vehicle travel, the electronic control device reduces the heating degree of the air conditioning device and increases the heating degree by the seat heater during EV travel in comparison with non-EV travel.

16 Claims, 9 Drawing Sheets

(51) Int. Cl.
*B60H 1/00* (2006.01)
*B60H 1/22* (2006.01)
*B60L 1/02* (2006.01)
*B60L 3/00* (2006.01)
*B60L 11/14* (2006.01)
*B60N 2/56* (2006.01)
*B60W 10/06* (2006.01)
*B60W 10/30* (2006.01)
*B60W 20/00* (2006.01)

(56) References Cited

U.S. PATENT DOCUMENTS

| | | | |
|---|---|---|---|
| 7,826,961 | B2 | 11/2010 | Jinno |
| 2004/0168455 | A1 | 9/2004 | Nakamura |
| 2007/0188125 | A1* | 8/2007 | Shepard ............... 318/778 |
| 2009/0198438 | A1 | 8/2009 | Jinno |
| 2010/0083916 | A1* | 4/2010 | Shintani et al. .......... 123/41.1 |
| 2011/0288708 | A1* | 11/2011 | Katono et al. ............ 701/22 |

FOREIGN PATENT DOCUMENTS

| | | |
|---|---|---|
| JP | A-63-184515 | 7/1988 |
| JP | A-6-16030 | 1/1994 |
| JP | A-10-89053 | 4/1998 |
| JP | A-11-151932 | 6/1999 |
| JP | A-11-180137 | 7/1999 |
| JP | A-2006-37780 | 2/2006 |
| JP | A-2006-151039 | 6/2006 |
| JP | A-2007-112349 | 5/2007 |
| JP | A-2008-8215 | 1/2008 |
| JP | A-2008-18057 | 1/2008 |
| JP | A-2008-168699 | 7/2008 |
| JP | A-2008-174042 | 7/2008 |
| JP | A-2009-6738 | 1/2009 |

OTHER PUBLICATIONS

Feb. 3, 2012 Extended Search Report issued in European Patent Application No. 10846974.3.

* cited by examiner (a) Vehicle Traveling
(b) Blower Motor Output Pbm
(c) Seat Heater Output Psh

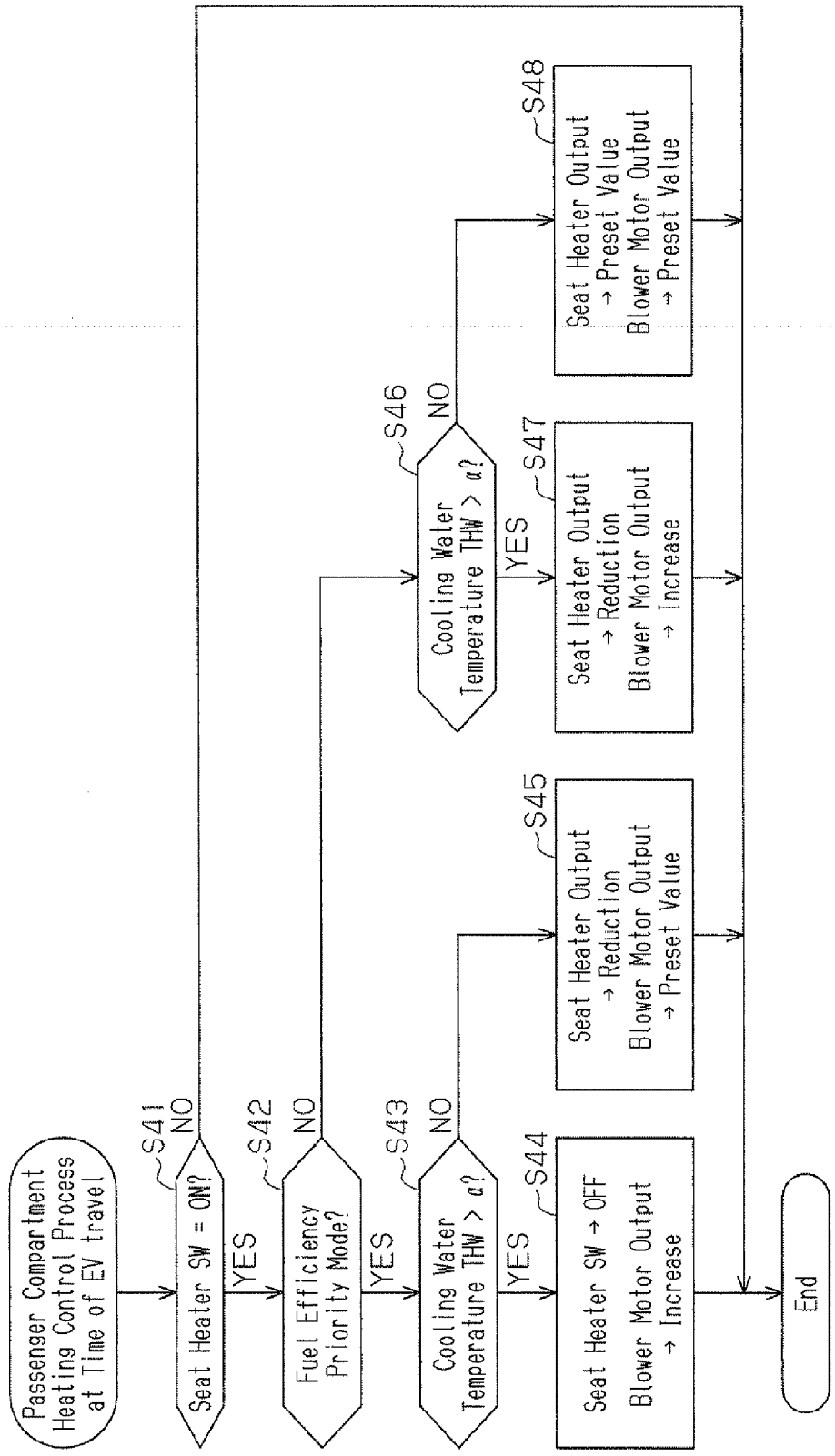

Fig.9

| Combustion Mode \ Cooling Water Temperature THW | α or Less | Higher than α |
|---|---|---|
| Normal Mode | Seat Heater Output → Preset Value<br>Blower Motor Output → Preset Value | Seat Heater Output → Reduction<br>Blower Motor Output → Increase |
| Fuel Efficiency Priority Mode | Seat Heater Output → Reduction<br>Blower Motor Output → Preset Value | Seat Heater SW → OFF<br>Blower Motor Output → Increase |

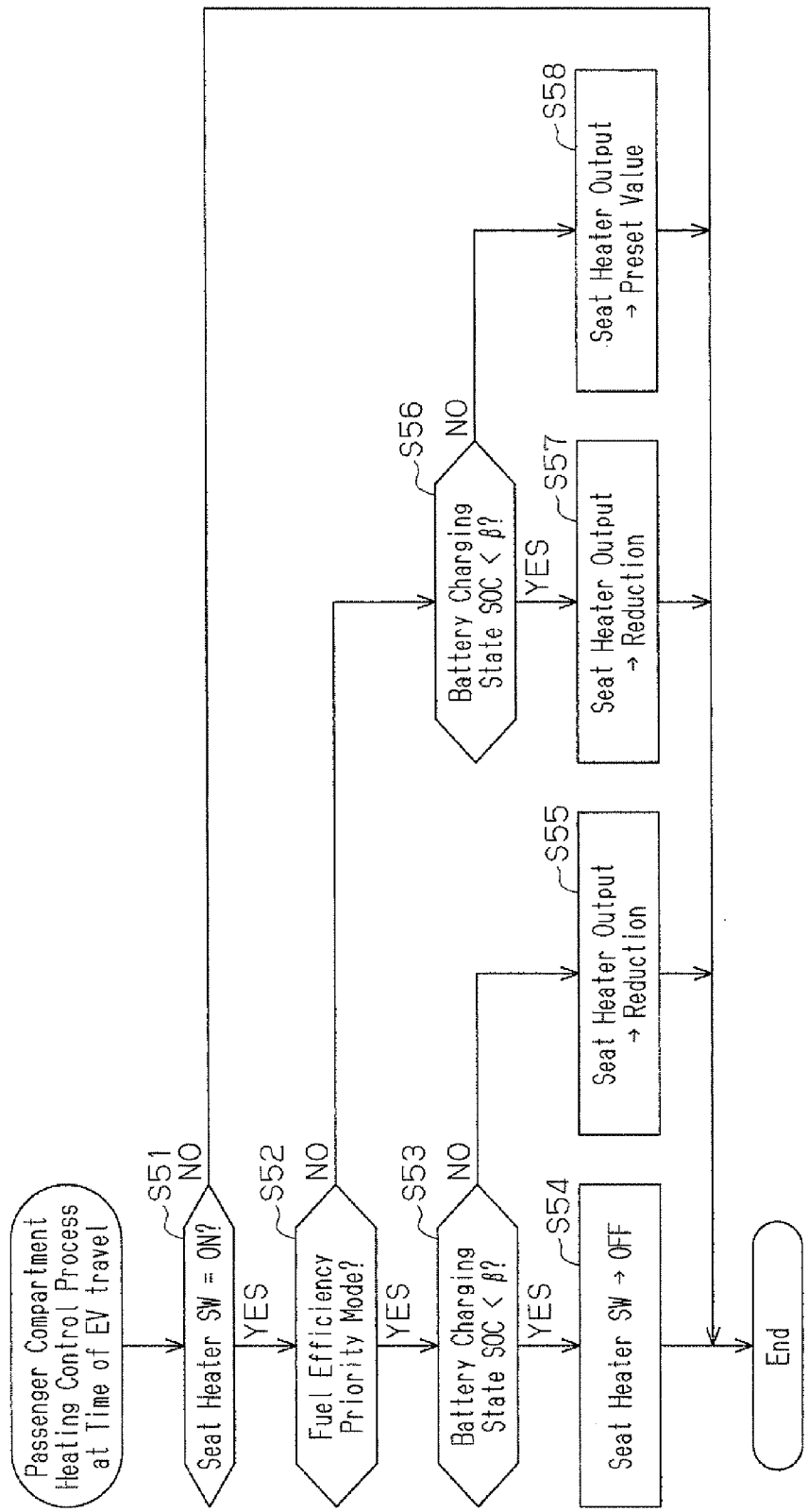

| Battery Charging State SOC / Combustion Mode | Lower than β | β or Higher |
|---|---|---|
| Normal Mode | Seat Heater Output → Reduction | Seat Heater Output → Preset Value |
| Fuel Efficiency Priority Mode | Seat Heater SW → OFF | Seat Heater Output → Reduction |

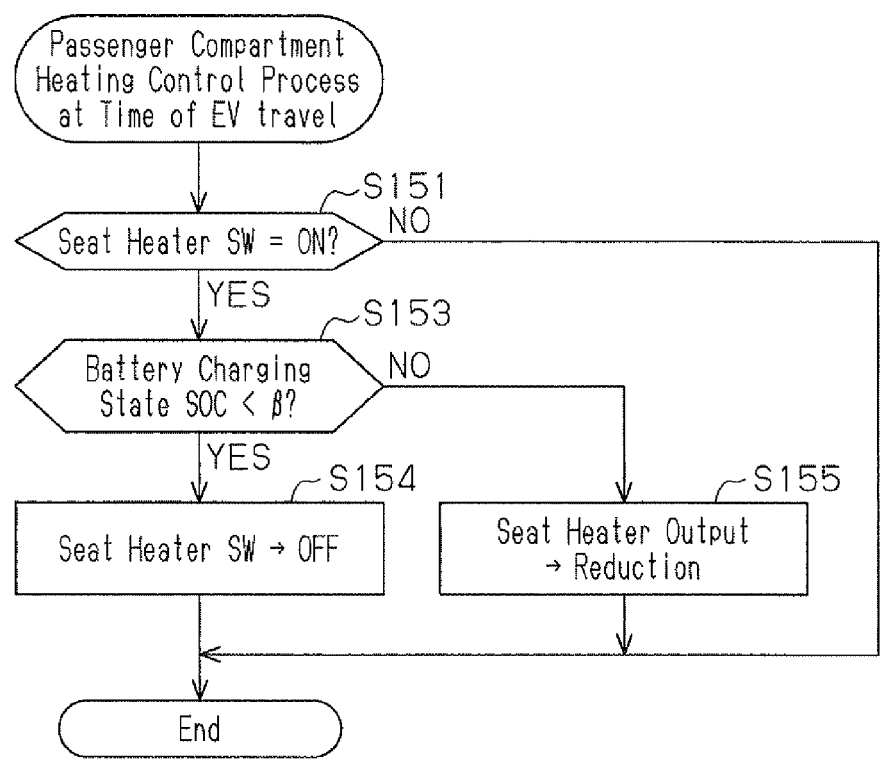

CONTROL DEVICE FOR VEHICLE

FIELD OF THE INVENTION

The present invention relates to a control device for a vehicle that is provided with an internal combustion engine for driving the vehicle, a motor for driving the vehicle, and a heating device heating the passenger compartment by using a power supply from a battery as a heat source, and carries out EV travel of the vehicle by setting the internal combustion engine to a stop state and driving the motor.

BACKGROUND OF THE INVENTION

Hybrid cars are known that use, as driving sources, an internal combustion engine and a motor driven by a power supply from a battery (refer, for example, to Patent Document 1). In the control device for the vehicle mentioned above, in order to achieve an improvement of a fuel efficiency of the internal combustion engine, "electric vehicle (EV) traveling" is carried out to make the vehicle travel by setting the internal combustion engine to a stop state and driving the motor.

Further, a water-cooled internal combustion engine is configured such that the engine is cooled by circulating cooling water within a water jacket that is formed in the cylinder head and the cylinder block. Further, the vehicle having such an internal combustion engine as a driving source is configured such that cooling water heated at a time of passing through the water jacket is fed to a heater core. Further, air delivery is carried out by a blower motor to the heater core, whereby hot air is generated by the heat of the cooling water of the heater core. Accordingly, heating of the passenger compartment is carried out.

In a vehicle provided with a water-cooled internal combustion engine and a motor, since heat accompanying combustion of the engine is not generated during EV travel, the cooling water is not heated, and the temperature of the cooling water is lowered gradually. Accordingly, if the temperature of the cooling water is lowered excessively, the ability to restart the internal combustion engine is hindered when EV travel is finished. Further, since hot air is not efficiently generated by the heater core, it is impossible to ensure a requested heating performance.

Accordingly, a conventional control device for a vehicle is configured to monitor the temperature of cooling water during EV travel and finish the EV travel to restart the internal combustion engine if the temperature of cooling water becomes equal to or less than a predetermined temperature, in order to limit excessive temperature reduction of the cooling water. Accordingly, it is possible to improve the ability to restart the internal combustion engine and to reliably ensure a requested heating performance.

Also, there has been known a vehicle provided with a seat heater that heats up seats in the passenger compartment by using power supplied by a battery as a heat source (refer to Patent Document 2). Further, a type of hybrid car has been developed that is provided with the seat heater mentioned above.

PRIOR ART DOCUMENT

Patent Document

Patent Document 1: Japanese Laid-Open Patent Publication No. 2007-112349
Patent Document 2: Japanese Laid-Open Patent Publication No. 2008-18057

SUMMARY OF THE INVENTION

However, in the conventional control device for a vehicle, the air delivery amount of a blower motor, that is, the output of a blower motor, and the output of the seat heater are not changed significantly between EV travel and non-EV travel. Therefore, in some settings of the output of the blower motor during EV travel, there is a case where a temperature reduction of the cooling water is promoted by the air delivered by the blower motor. In this case, the temperature of the cooling water becomes equal to or less than the predetermined temperature at an early stage, so that the duration of the EV travel can become shortened. Further, in some settings of the output of the seat heater at a time of the EV travel, there is a case where the consumption of electric power from the battery is increased by use of the seat heater. In this case, the charging state of the battery is lowered at an early stage, which can shorten the duration of the EV travel. Accordingly, since it is impossible to adequately ensure the duration of the EV travel, the fuel efficiency of the internal combustion engine cannot be reliably improved.

With respect to the problem mentioned above, promotion of the temperature reduction of the cooling water may be suppressed by inhibiting the actuation of the blower motor all the time during the EV travel. Further, promotion of consumption of the electric power of the battery may be suppressed by inhibiting the actuation of the seat heater all the time during the EV travel. However, in these cases, the heating of the passenger compartment is not carried out despite a heating request from an occupant. As a result, the occupant feels disturbed.

Further, the problems mentioned above are not limited to the control device for a vehicle that is provided with both the air conditioning device having the heater core and the blower motor mentioned above, and the seat heater. The problems can occur in any control device for a vehicle that is applied to a vehicle that is provided with an internal combustion engine for driving the vehicle, a motor for driving the vehicle, and a heating device for heating the passenger compartment by using power supply from the battery as a heat source and that carries out EV travel by stopping the internal combustion engine and driving the motor.

Accordingly, it is an objective of the present invention to provide a control device for a vehicle that can increase the duration of EV travel while adequately maintaining heating in the passenger compartment through setting of the heating degree by a heating device.

To achieve the foregoing objective and in accordance with the present invention, a control device for a vehicle is provided that includes an internal combustion engine for driving a vehicle, a motor for driving the vehicle, a main heating device, an auxiliary heating device, a driving control portion, and a heating control portion. The main heating device heats a passenger compartment by using cooling water passing through the internal combustion engine as a heat source. The auxiliary heating device heats the passenger compartment by using a power supply from a battery as a heat source. The driving control portion performs EV travel of the vehicle by driving the motor while setting the internal combustion engine to a stop state and restarts the internal combustion engine if a temperature of the cooling water becomes equal to or less than a predetermined temperature during EV travel. The heating control portion controls the main heating device and the auxiliary heating device in correspondence with a heating request. When the heating request is output to make the main heating device heat the passenger compartment during travel of the vehicle, the heating control portion reduces a heating degree by the main heating device during EV travel in comparison with non-EV travel and causes the auxiliary heating device to heat the passenger compartment.

In accordance with the structure, the heating degree by the main heating device is reduced in the case of the EV travel in comparison with non-EV travel, when the heating request is output to the main heating device during the vehicle travel to carry out the heating of the passenger compartment. Accordingly, it becomes possible to suppress the temperature reduction of the cooling water of the internal combustion engine, which is the heat source of the main heating device. Therefore, it is possible to increase the time until the temperature of the cooling water becomes equal to or less than the predetermined temperature during the EV travel, that is, to increase the duration of the EV travel. Further, the heating of the passenger compartment is carried out by the auxiliary heating device in conjunction with the reduction of the heating degree by the main heating device. Accordingly, it is possible to suppress such a matter that the passenger compartment is hard to be heated due to the reduction of the heating degree by the main heating device. Therefore, it is possible to increase the duration of the EV travel while adequately maintaining the heating of the passenger compartment, through setting of the heating degrees by the main heating device and the auxiliary heating device.

It is preferable that, when the heating request is output to make the main heating device heat the passenger compartment during the vehicle travel, the heating control portion reduces the heating degree by the main heating device and increases the heating degree by the auxiliary heating device, in the case of EV travel in comparison with non-EV travel.

In accordance with the aspect, the heating degree by the auxiliary heating device is increased in conjunction with the reduction of the heating degree by the main heating device. Accordingly, it is possible to adequately suppress such a matter that the passenger compartment is hard to be heated due to the reduction of the heating degree by the main heating device, on the basis of the actuation of the auxiliary heating device. Therefore, it is possible to increase the duration of the EV travel while further adequately maintaining the heating of the passenger compartment.

It is preferable that the heating control portion sets the heating degree by the main heating device and the heating degree by the auxiliary heating device such that the heating degrees of the passenger compartment by both of the main heating device and the auxiliary heating device are the same between EV travel and non-EV travel.

If the heating degree of the passenger compartment is widely changed as the result of carrying out the control of increasing the heating degree by the auxiliary heating device as well as reducing the heating degree by the main heating device, the occupant may feel disturbed.

In this regard, in accordance with the aspect mentioned above, the heating degree by the main heating device and the heating degree of the auxiliary heating device are set such that the heating degrees of the passenger compartment by both of the main heating device and the auxiliary heating device are the same between EV travel and non-EV travel, through the heating control portion. Accordingly, the heating degree of the passenger compartment does not change between before execution of the control and after execution thereof. Accordingly, it is possible to prevent the occupant from feeling disturbed due to the execution of the control.

It is preferable that: the cooling water circulate in an inner portion of the internal combustion engine and a heater core through a cooling water circuit; the main heating device be an air conditioning device provided with a blower motor that delivers air to the heater core to generate hot air for heating the passenger compartment; the blower motor be actuated on the basis of a power supply from the battery that feeds electric power to the motor; and the heating control portion set the heating degree by the main heating device and the heating degree by the auxiliary heating device to prevent a summation of amounts of electric power consumption of the main heating device and the auxiliary heating device from being increased during EV travel in comparison with non-EV travel.

In accordance with the aspect, the heating degree by the main heating device and the heating degree by the auxiliary heating device are set such that a summation of the amounts of the electric power consumption by the main heating device and the auxiliary heating device does not increase between the case of the EV travel and non-EV travel. Accordingly, the amount of the electric power consumption is not increased due to the execution of the control. Since it is possible to inhibit the amount of the consumption of the electric power of the battery from being increased, it is possible to adequately increase the duration of the EV travel.

It is preferable that the heating control portion inhibits the heating of the passenger compartment by the main heating device when the heating request is output during EV travel of the vehicle.

In accordance with the aspect, since the heating of the passenger compartment by the main heating device is inhibited, it is possible to prevent the temperature of the cooling water of the internal combustion engine from being lowered due to the actuation of the main heating device. Accordingly, it is possible to further increase the time until the temperature of the cooling water becomes equal to or less than the predetermined temperature during the EV travel, that is, the duration of the EV travel.

Also, to achieve the foregoing objective and in accordance with the present invention, a control device for a vehicle is provided that includes an internal combustion engine for driving the vehicle, a motor driving the vehicle on the basis of a power supply from a battery, a main heating device, an auxiliary heating device, a driving control portion, and a heating control portion. The main heating device heats a passenger compartment by using cooling water passing through the internal combustion engine as a heat source. The auxiliary heating device heats the passenger compartment by using the power supply from the battery as a heat source. The driving control portion performs EV travel of the vehicle by driving the motor while setting the internal combustion engine to a stop state and restarts the internal combustion engine if a temperature of the cooling water becomes equal to or less than a predetermined temperature during EV travel. The heating control portion controls the main heating device and the auxiliary heating device in correspondence with a heating request. When the heating request is output to make the auxiliary heating device perform heating of the passenger compartment during EV travel of the vehicle, the heating control portion reduces a heating degree of the auxiliary heating device and increases a heating degree of the main heating device when a temperature of the cooling water is relatively high, in comparison with a case in which the temperature of the cooling water is relatively low.

In accordance with the structure, when the heating request is output heat the passenger compartment during EV travel of the vehicle, the heating degree by the auxiliary heating device is reduced when the temperature of the cooling water is higher in comparison with the case where it is lower. Accordingly, since it is possible to reduce the electric power that is consumed from the battery on the basis of the actuation of the auxiliary heating device, it is possible to increase the duration of the EV travel. Further, the heating degree by the main heating device is increased when the temperature of the cooling water is higher in comparison with the case where it is lower, in conjunction with the reduction of the heating degree by the auxiliary heating device. Accordingly, it is possible to reduce the difficulty of heating the passenger compartment on the basis of the reduction of the heating degree by the auxiliary heating device. Further, since the heating degree by the main heating device using the cooling water of the internal combustion engine as the heat source is reduced when the temperature of the cooling water is lower in comparison with the case where it is higher, it is possible to adequately suppress an excessive reduction of the temperature of the cooling water. Accordingly, it is possible to delay the reduction of the temperature of the cooling water to a temperature equal to or less than the predetermined temperature during the EV travel. Thus, the duration of the EV travel is not shortened. Accordingly, it is possible to increase the duration of the EV travel while adequately maintaining the heating of the passenger compartment, through setting of the heating degree by the main heating device and the auxiliary heating device.

It is preferable that the heating control portion reduces the heating degree of the auxiliary heating device and increases the heating degree of the main heating device when the temperature of the cooling water is higher than a reference temperature, which is higher than the predetermined temperature, in comparison with the case where the temperature of the cooling water is lower than the reference temperature.

In accordance with the aspect, it is possible to advantageously increase the duration of EV travel on the basis of the simple aspect, while adequately maintaining the heating of the passenger compartment.

It is preferable, when a mode giving priority to saving of an amount of fuel consumption is selected as a combustion mode of the internal combustion engine, the heating control portion further reduce the heating degree by the auxiliary heating device, which is set in correspondence with the temperature of the cooling water, in comparison with the case where other combustion mode is selected.

In accordance with the aspect, the heating degree by the auxiliary heating device, which is set in correspondence with the temperature of the cooling water, is further reduced when the mode giving priority to saving fuel is selected as the combustion mode of the internal combustion engine in comparison with other combustion mode is selected. Accordingly, since it is possible to further lower the electric power that is consumed from the battery on the basis of the operation of the auxiliary heating device, the duration of the EV travel can be further extended. The occupant may experience a disturbing sensation on the basis of the reduction of the heating degree by the auxiliary heating device. Further, since the control of setting the heating degree by the auxiliary heating device is performed when the driver positively selects the mode giving priority to saving fuel as the combustion mode of the internal combustion engine, the disturbing sensation is easier to tolerate for the occupant.

It is preferable that the heating control portion inhibits the heating of the passenger compartment by the auxiliary heating device when the temperature of the cooling water is higher than a reference temperature, which is higher than the predetermined temperature.

In accordance with the aspect, since the heating of the passenger compartment by the auxiliary heating device is inhibited, electric power is not consumed from the battery on the basis of the actuation of the auxiliary heating device. Accordingly, it is possible to further increase the duration of EV travel.

Further, the cooling water circulates in the inner portion of the internal combustion engine and the heater core through the cooling water circuit, and the main heating device can be embodied by an aspect of an air conditioning device that is provided with a blower motor delivering air to the heater core for generating hot air for heating the passenger compartment.

Further, the auxiliary heating device can be embodied by an aspect of a seat heater heating a vehicle seat.

It is preferable that the heating control portion change at least one of the heating degree by the main heating device and the heating degree by the auxiliary heating device gradually.

If the heating degree by the main heating device or the heating degree of the auxiliary heating device is rapidly changed, the occupant may feel disturbed.

In this regard, in accordance with the aspect mentioned above, since at least one of the heating degree by the main heating device and the heating degree by the auxiliary heating degree is changed gradually, it is possible to limit the disturbing sensation experienced by the occupant on the basis of the change of the heating degree by the main heating device or the heating degree by the auxiliary heating device. Further, if both of the heating degree by the main heating device and the heating degree by the auxiliary heating degree are changed gradually, it is possible to further inhibit the disturbing sensation on the basis of the change of the heating degrees.

Also, to achieve the foregoing objective and in accordance with the present invention, a control device for a vehicle is provided that includes an internal combustion engine for driving the vehicle, a motor driving the vehicle on the basis of a power supply from a battery, a heating device for heating a passenger compartment by using the power supply from the battery as a heat source, a driving control portion, and a heating control portion. The driving control portion performs EV travel of the vehicle by driving the motor while setting the internal combustion engine to a stop state. The heating control portion controls the heating device in correspondence with a heating request. When the heating request is output to make the heating device heat the passenger compartment during EV travel of the vehicle, the heating control portion reduces a heating degree of the heating device when a charging state of the battery is lower in comparison with the case where the charging state of the battery is higher.

In accordance with the structure, when the charging state of the battery is low, the electric power consumed from the battery is lowered by reducing the heating degree by the heating device. Accordingly, it is possible to increase the duration of the EV travel. Further, when the charging state of the battery is high, the heating degree of the passenger compartment can be maintained to some degree by not reducing the heating degree by the heating device or making the reducing degree small. Accordingly, it is possible to maintain the heating degree of the passenger compartment high while maintaining the duration of the EV travel long. Accordingly, it is possible to increase the duration of the EV travel while adequately maintaining the heating of the passenger compartment through the setting of the heating degree by the heating device.

It is preferable that the heating control portion reduces the heating degree by the heating device when the charging state of the battery is lower than a predetermined state, in comparison with a case in which the charging state of the battery is higher than the predetermined state.

In accordance with the aspect, it is possible to achieve such an advantage as to increase the duration of the EV travel on the basis of a simple aspect, while suppressing the matter that the heating of the passenger compartment is not carried out.

It is preferable that, when a mode giving priority to saving of an amount of fuel consumption is selected as a combustion mode of the internal combustion engine, the heating control portion further reduce the heating degree of the heating device, which is set in correspondence to the charging state of the battery, in comparison with other combustion mode is selected.

In accordance with the aspect, the heating degree by the heating device, which is set in correspondence to the charging state of the battery, is further reduced in the case where the mode giving priority to saving of an amount of fuel consumption is selected as the combustion mode of the internal combustion engine in comparison with other combustion mode is selected. Accordingly, since it is possible to further reduce the electric power that is consumed from the battery on the basis of the actuation of the heating device, it is possible to further increase the duration of the EV travel.

It is preferable that the heating control portion inhibits the heating of the passenger compartment by the heating device in the case where the charging state of the battery is lower than a predetermined state.

In accordance with the aspect, since the heating of the passenger compartment by the heating device is inhibited, the electric power is not consumed from the battery on the basis of the actuation of the heating device. Accordingly, it is possible to further increase the duration of the EV travel.

Further, the heating device can be embodied by an aspect of the seat heater heating the vehicle seat.

Also, to achieve the foregoing objective and in accordance with the present invention, a control device for a vehicle is provided that includes an internal combustion engine for driving a vehicle, a motor driving the vehicle on the basis of a power supply from a battery, a main heating device heating a passenger compartment by using an exhaust heat from the vehicle, an auxiliary heating device heating the passenger compartment by using a power supply from the battery as a heat source, a driving control portion, and a heating control portion. The driving control portion performs EV travel of the vehicle by driving the motor while setting the internal combustion engine to a stop state and restarts the internal combustion engine if a temperature of the internal combustion engine becomes equal to or less than a predetermined temperature during the EV travel. The driving control portion performs EV travel of the vehicle by driving the motor while setting the internal combustion engine to a stop state and restarts the internal combustion engine if a temperature of cooling water of the internal combustion engine becomes equal to or less than a predetermined temperature during EV travel. The heating control portion controls the main heating device and the auxiliary heating device in correspondence with a heating request. When the heating request is output to make the auxiliary heating device heat the passenger compartment during EV travel of the vehicle, the heating control portion reduces a heating degree by the auxiliary heating device and increases a heating degree by the main heating device when the temperature of the heat source of the main heating device is relatively high, in comparison with a case in which the temperature of the heat source of the main heating device is relatively low.

In accordance with the structure, when the heating request is output to cause the auxiliary heating device to heat the passenger compartment during EV travel of the vehicle, the heating degree by the auxiliary heating device is reduced if the temperature of the heat source of the main heating device is relatively high, in comparison with the case where it is relatively low. Accordingly, since the electric power consumed from the battery on the basis of the actuation of the auxiliary heating device can be reduced, it is possible to increase the duration of EV travel. Further, the heating degree by the main heating device is increased if the temperature of the heat source of the main heating device is high, in comparison with the case where it is low, in conjunction with the reduction of the heating degree by the auxiliary heating device. Accordingly, it is possible to reduce the difficulty of heating the passenger compartment due to the reduction of the heating degree by the auxiliary heating device. Further, it is possible to adequately limit the temperature reduction of the heat source of the main heating device. Accordingly, for example, in the structure in which the cooling water of the internal combustion engine is employed as the heat source of the main heating device, it is possible to delay the time when the temperature of the cooling water becomes equal to or less than the predetermined temperature during EV travel. That is, the duration of EV travel is extended. Therefore, it is possible to increase the duration of EV travel while adequately maintaining the heating of the passenger compartment through the setting of the heating degree by the main heating device and the auxiliary heating device.

BRIEF DESCRIPTION OF THE DRAWINGS

FIG. 8 is a flowchart showing a process for setting the output of the blower motor and the output of the seat heater, in a fourth embodiment of the control device for a vehicle in accordance with the present invention;

FIG. 9 is a table showing relationships among combustion modes of an internal combustion engine, a level of a cooling water temperature and the output of the seat heater and the blower motor, in the fourth embodiment;

FIG. 10 is a flowchart showing a process for setting the output of the seat heater, in a fifth embodiment of the control device for a vehicle in accordance with the present invention;

FIG. 13 is a flowchart showing a process for setting the output of the seat heater, in a modified example of the fifth embodiment.

DETAILED DESCRIPTION OF THE PREFERRED EMBODIMENTS

First Embodiment

A control device for a vehicle according to a first embodiment of the present invention will now be described with reference to FIGS. 1 to 4.

Figure 1:
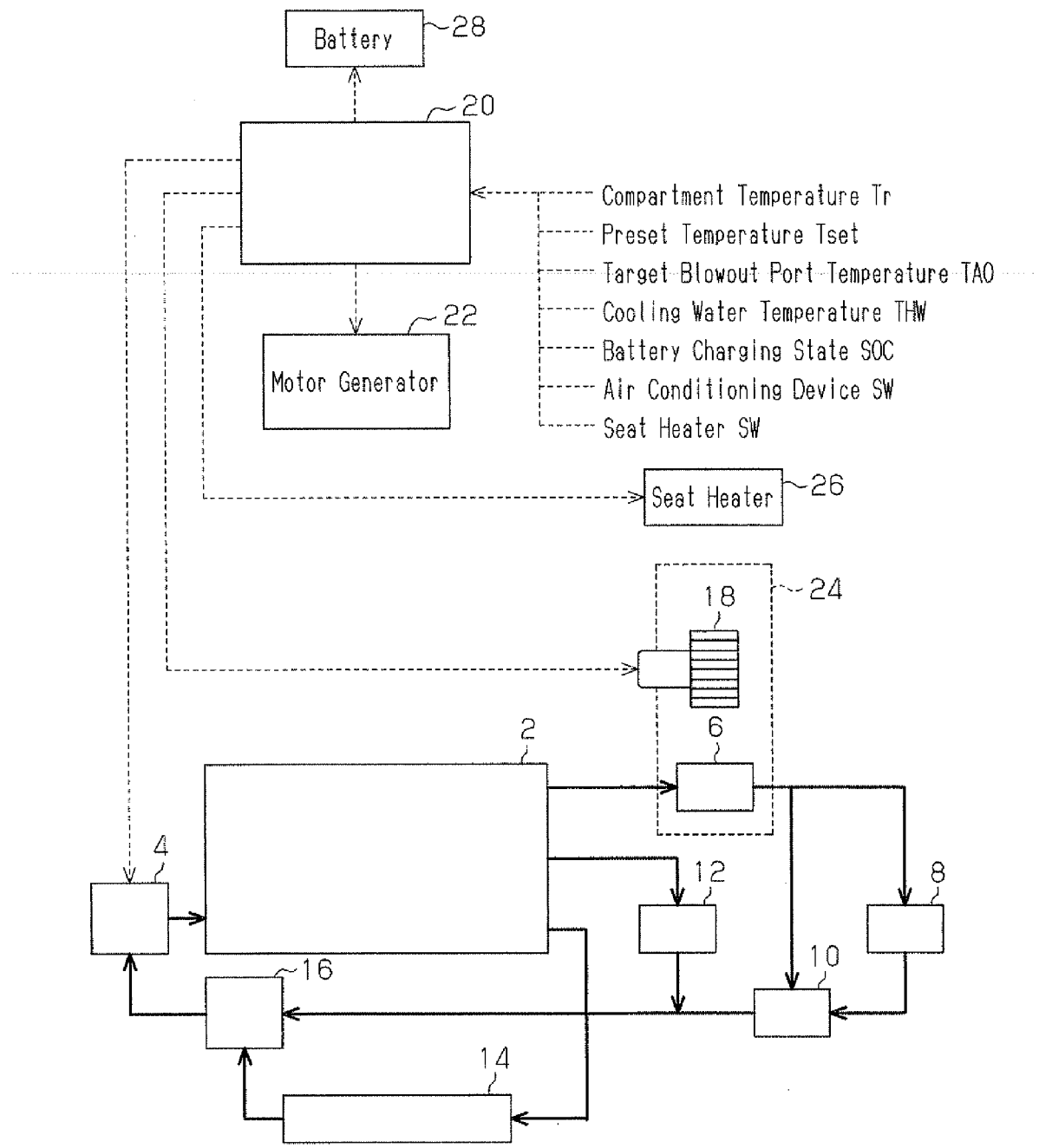
FIG. 1 is a block diagram showing an outline structure centering on a cooling water circuit, in a first embodiment of a control device for a vehicle in accordance with the present invention.

FIG. 1 shows an outline structure centering on a cooling water circuit, with respect to the control device for a vehicle in accordance with the present embodiment.

As shown in the same drawing, the cooling water circuit of the vehicle is provided with a first cooling water circuit and a second cooling water circuit.

The first cooling water circuit is structured to pass through a motor-driven water pump 4 that circulates cooling water, a water jacket that is provided in an inner portion of an internal combustion engine 2 for driving the vehicle, a radiator 14 and a thermostat 16, and come back again to the motor-driven water pump 4. The radiator 14 is a heat exchanger that cools the cooling water on the basis of a heat exchange with an ambient air. The thermostat 16 is constructed as a temperature sensing type valve. The thermostat 16 inhibits circulation of the cooling water through the radiator 14 by closing the valve at a time when the temperature of the cooling water is low in the periphery of a temperature sensing portion. Further, the thermostat 16 allows circulation of the cooling water through the radiator 14 by opening the valve at a time when the temperature of the cooling water is high in the periphery of the temperature sensing portion.

The second cooling water circuit is structured to pass through the water jacket of the internal combustion engine 2, a heater core 6, an exhaust heat recovery device 8, an EGR cooler 10 and the thermostat 16 from the motor-driven water pump 4 and come back again to the motor-driven water pump 4. The heater core 6 generates hot air that is sent to a passenger compartment on the basis of heat of the cooling water. The exhaust heat recovery device 8 recovers heat of exhaust gas through heat exchange between the cooling water and the exhaust gas. The EGR cooler 10 cools the exhaust gas that is recirculated to the intake system from the exhaust system of the internal combustion engine 2 through heat exchange with the cooling water. The second cooling water circuit is provided with a bypass passage that bypasses the exhaust heat recovery device 8. Further, the second cooling water circuit is provided with a connection passage that is connected between the EGR cooler 10 and the thermostat 16 through a throttle body 12 from the water jacket of the internal combustion engine 2.

An air conditioning device 24 arranged in the vehicle is provided with a blower motor 18 delivering air to the heater core 6 to generate hot air for heating the passenger compartment. In the present embodiment, a structure that can continuously change an output Pbm is employed as the blower motor 18. In other words, if the temperature of the cooling water is the same, the greater the output Pbm of the blower motor 18, the greater the heating degree of the passenger compartment by the blower motor 18 becomes. A structure that can change the output by a plurality of stages can be employed as the blower motor.

Further, the vehicle is provided with a motor generator 22 that has a function as a motor for driving the vehicle in conjunction with a function as a power generator.

The vehicle is constructed as a vehicle that is provided with the internal combustion engine 2 and the motor generator 22, that is, a "hybrid car".

Further, the vehicle is provided with a seat heater 26 that heats up a seat. In the present embodiment, a structure that can continuously change an output Psh is employed as the seat heater 26. In other words, in accordance with the output Psh of the seat heater 26 is made larger, the heating degree of the passenger compartment by the seat heater 26 is made larger. A structure that can change the output by a plurality of stages can be employed as the seat heater.

The motor generator 22, the blower motor 18 and the seat heater 26 are structured to be actuated by a power supply from the same battery 28.

Various controls of the vehicle such as a control of the internal combustion engine 2, a control of the motor generator 22, a control of the air conditioning device 24 and a control of the seat heater 26 are carried out by an electronic control device 20. The electronic control device 20 is provided with a central processing unit (CPU), a read-only memory (ROM), a random access memory (RAM) and an input and output port (I/O). The CPU executes various computing processes in accordance with the various controls of the vehicle, and the ROM stores programs and data that are used for the various controls. Further, the RAM temporarily stores results of detection of various sensors provided in respective portions of the vehicle and results of computation of the CPU. Further, the I/O becomes the medium of input and output of signals between the electronic control device 20 and an external portion.

The information such as the detection information of the sensors provided in the respective portions of the vehicle, the actuation information of switches and the like is input to the electronic control device 20. For example, the electronic control device 20 receives a compartment temperature Tr, a preset temperature Tset of the air conditioning device 24, and a target blowout port temperature (TAO) corresponding to a target value of a temperature of hot and cold wind that is sent into the passenger compartment from a blowout port of the air conditioning device 24. Further, a temperature (a cooling water temperature) THW of cooling water of the internal combustion engine 2 is input to the electronic control device 20. Further, the electronic control device 20 receives a charging state (SOC) of the battery 28, the actuation information of the switch of the air conditioning device 24, that is, a preset value of an output Pbm of the blower motor 18, and the actuation information of the switch of the seat heater 26, that is, a preset value of an output Psh of the seat heater 26. The charging state SOC of the battery 28 is an index that indicates the rate of the current electric power value with respect to the maximum electric power value that can be stored in the battery 28. Further, in the present embodiment, the sensor detecting the cooling water temperature THW is provided between the water jacket and the heater core 6 in the second cooling water circuit, however, may be provided, for example, in an inner portion of the water jacket, in an inner portion of the heater core 6, or between the heater core 6 and the exhaust heat recovery device 8.

In the present embodiment, the electronic control device 20 is structured to carry out EV travel of the vehicle by setting the internal combustion engine 2 to a stop state and driving the motor generator 22, in order to achieve an improvement of a fuel efficiency of the internal combustion engine 2.

Since no heat accompanying the combustion of the internal combustion engine 2 is newly generated during EV travel, as mentioned above, the cooling water is not heated, and the temperature of the cooling water is lowered gradually. Accordingly, if the temperature of the cooling water is excessively lowered, the ability to restart the internal combustion engine 2 will be reduced when finishing EV travel. Further, since hot air is not sufficiently generated by the heater core 6, a requested heating performance cannot be ensured.

Accordingly, the present embodiment is structured to monitor the cooling water temperature THW during EV travel in order to suppress an excessive temperature reduction of the cooling water, and finish EV travel and restart the internal combustion engine 2 if the cooling water temperature THW becomes equal to or less than a predetermined temperature THWth. Accordingly, the ability to restart the internal combustion engine 2 is improved. Further, the requested heating performance is reliably ensured. The predetermined temperature THW is a value that is previously set through experimentation or simulation and is set to a value that is obtained by taking into consideration the ability to restart the internal combustion engine 2 and the heating performance.

In some settings of the output Pbm of the blower motor 18 at a time of EV travel, the temperature reduction of the cooling water might be increased by the air delivered by means of the blower motor 18. In this case, the cooling water temperature THW becomes equal to or less than the predetermined temperature THWth at an early stage, and the duration of EV travel may be reduced. Further, in some settings of the output Psh of the seat heater 26 during EV travel, the consumption of the electric power of the battery 28 is increased by the actuation of the seat heater 26. In this case, the charging state SOC of the battery 28 is lowered at an early stage, and the duration of the EV travel might be shortened. Therefore, since it is impossible to adequately ensure the duration of EV travel, it is impossible to reliably achieve an improvement of the fuel efficiency of the internal combustion engine 2.

With respect to the problems mentioned above, an increase of the temperature reduction of the cooling water may be suppressed by inhibiting the actuation of the blower motor 18 during all of the EV travel time. Further, the increase in the consumption of the electric power of the battery 28 may be suppressed by inhibiting the actuation of the seat heater 26 during all of the EV travel time. However, in these cases, the passenger compartment will not be heated even if there is a heating request from the occupant. As a result, a disturbing sensation is experienced by the occupant.

Accordingly, the electronic control device 20 in accordance with the present embodiment is structured to increase the heating degree by the seat heater 26 and reduce the heating degree by the air conditioning device 24 during EV travel in comparison with non-EV travel, when a heating request is output to make the air conditioning device 24 heat the passenger compartment during the vehicle travel. Accordingly, it is possible to achieve adequate maintenance of the heating of the passenger compartment and an increase of the duration of EV travel.

Figure 2:
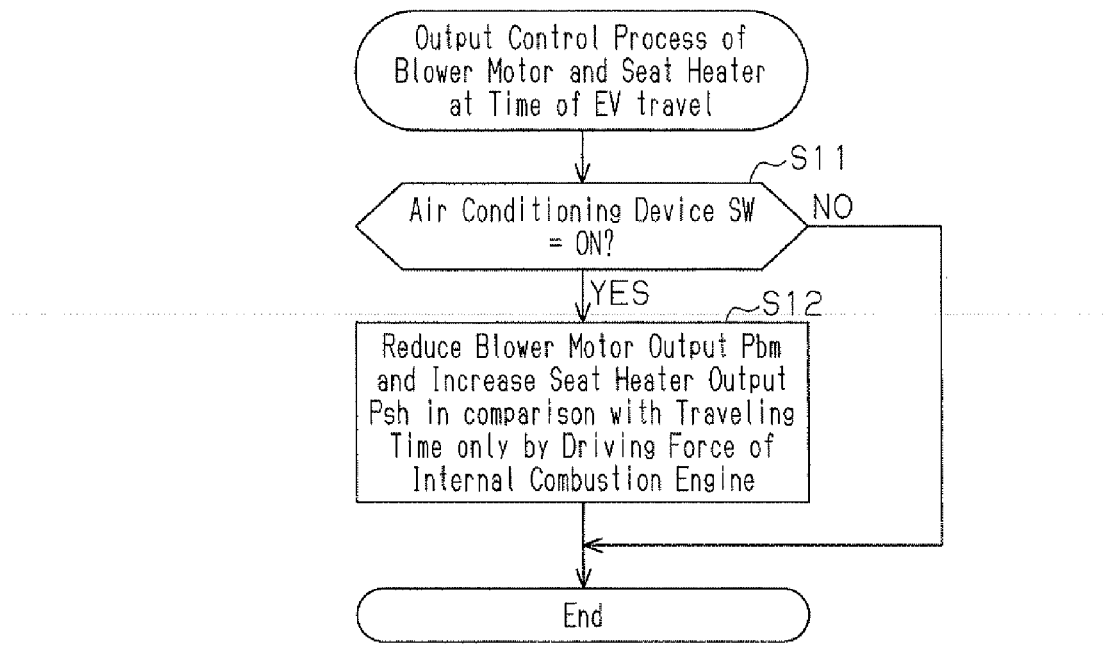
FIG. 2 is a flowchart showing a process for setting an output of a blower motor and an output of a seat heater in the first embodiment.

Next, a description will be given of a process for setting the output Pbm of the blower motor 18 and the output Psh of the seat heater 26 in the present embodiment, with reference to FIG. 2. FIG. 2 is a flowchart showing the setting process, which is periodically executed repeatedly by the electronic control device 20 during EV travel.

As shown in the same drawing, when the present process is started, the electronic control device 20 first determines in step S11 whether or not the switch of the air conditioning device 24 is "ON". In the case where the switch of the air conditioning device 24 is "ON" (YES in step S11), the process proceeds to step S12, and the output Pbm of the blower motor 18 is set to a value that is set by the switch of the air conditioning device 24, that is, a value that is reduced by a predetermined value $\Delta P1$ from a value that is set at a traveling time of the vehicle on the basis of only the driving force of the internal combustion engine 2. The predetermined value $\Delta P1$ is set to a value that is smaller than the current output Pbm of the blower motor 18, whereby the output Pbm of the blower motor 18 after being reduced is set to a value that is larger than "0". In other words, the actuation of the blower motor 18 is not stopped by the reduction of the output Pbm. Further, the output Psh of the seat heater 26 is set to a value that is set by the switch of the seat heater 26, that is, a value that is increased by only the predetermined value $\Delta P1$ from the value set at the traveling time of the vehicle on the basis of only the driving force of the internal combustion engine 2. As mentioned above, in the present embodiment, summations of the amount of the electric power consumption by the air conditioning device 24 and the seat heater 26 are the same between the case of EV travel and non-EV travel. If the output Pbm of the blower motor 18 and the output Psh of the seat heater 26 are set as mentioned above, a series of processes are once finished.

In the case where the switch of the air conditioning device 24 is "OFF" in step S11 (NO in step S11), the temperature reduction of the cooling water is not promoted on the basis of the actuation of the blower motor 18. Accordingly, the series of processes are once finished.

Figure 3:
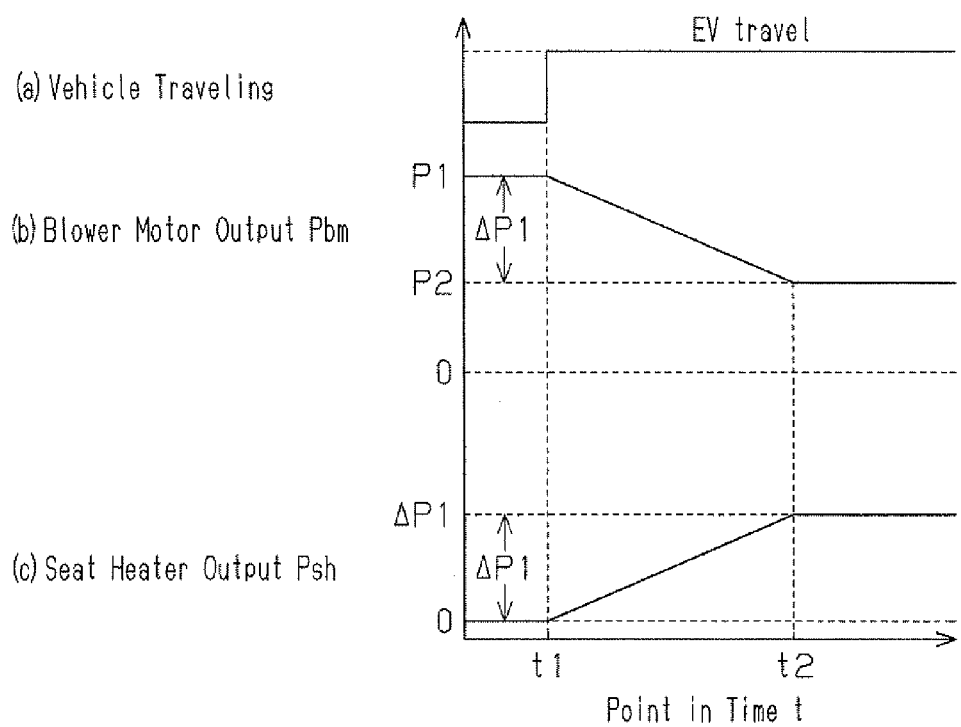
FIG. 3 is a timing chart showing an example of transition of the output of the blower motor and the output of the seat heater during EV travel of the first embodiment.
Figure 4:
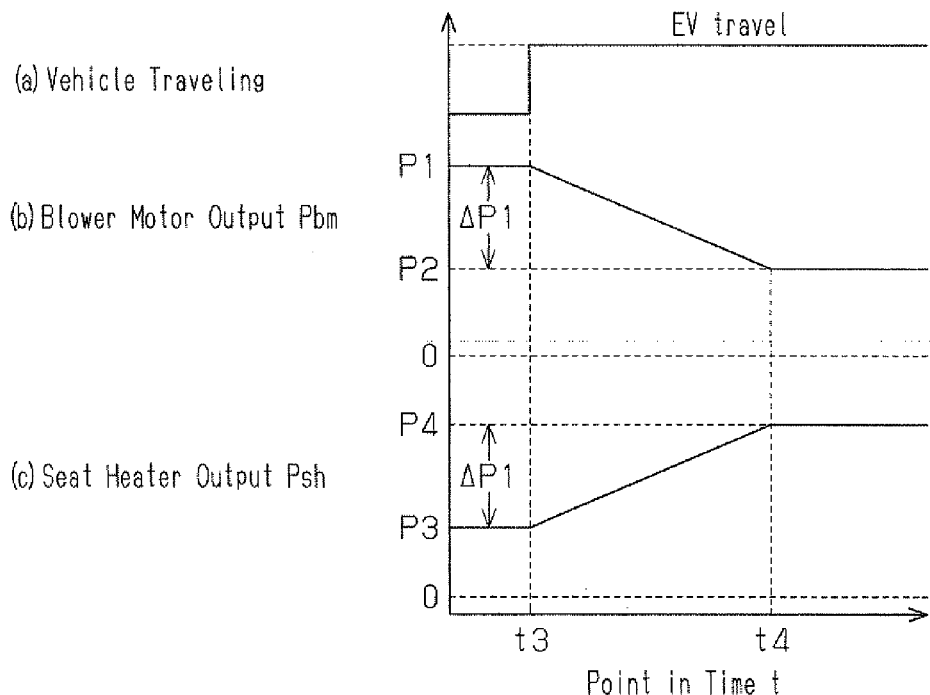
FIG. 4 is a timing chart showing another example of the transition of the output of the blower motor and the output of the seat heater during EV travel of the first embodiment.

FIGS. 3 and 4 are timing charts for describing an example of transitions of the output Pbm of the blower motor 18 and the output Psh of the seat heater 26 during EV travel. FIGS. 3 and 4 both show an example when the switch of the air conditioning device 24 is set to "ON" before EV travel is started. Further, FIG. 3 shows an example in the case where the switch of the seat heater 26 is set to "OFF" until EV travel is started. FIG. 4 shows an example in the case where the switch of the seat heater 26 is set to "ON" before EV travel is started.

As shown in FIG. 3, if EV travel of the vehicle is started at a point in time t1 in a state in which the output Pbm of the blower motor 18 is set to P1, and the output Psh of the seat heater 26 is set to "0" (FIGS. 3B and 3C), the output Pbm of the blower motor 18 decreases gradually and is set to P2, which is smaller by $\Delta P1$ than P1 at a point in time t2. Further, the output Psh of the seat heater 26 increases gradually from the point in time t1 and is set to $\Delta P1$ at the point in time t2.

As shown in FIG. 4, if EV travel of the vehicle is started at a point in time t3 in a state in which the output Pbm of the blower motor 18 is set to P1, the output Psh of the seat heater 26 is set to P3 (>0) (FIGS. 4(b) and 4(c)), and the output Pbm of the blower motor 18 is decreased gradually, and is set to P2 (>0), which is smaller by $\Delta P1$ than P1 at a point in time t4. Further, the output Psh of the seat heater 26 is increased gradually from the point in time t3 and is set to P4, which is larger by $\Delta P1$ than P3 at the point in time t4.

The motor generator 22 corresponds to the motor in accordance with the present invention. Further, the air conditioning device 24 corresponds to the main heating device in accordance with the present invention. Further, the seat heater 26 corresponds to the auxiliary heating device in accordance with the present invention. Further, the electronic control device 20 corresponds to the driving control portion and the heating control portion in accordance with the present invention.

In accordance with the control device for a vehicle on the basis of the present embodiment described above, the following advantages shown in items (1) to (3) can be obtained.

(1) The vehicle is provided with the internal combustion engine 2 for driving the vehicle, the motor generator 22 for driving the vehicle, the air conditioning device 24, which heats up the passenger compartment by using the cooling water passing through the internal combustion engine 2 as the heat source, and the seat heater 26, which heats up the seat in the passenger compartment by using the power supply from the battery 28 as the heat source. The cooling water circulates in the inner portion of the internal combustion engine 2 and the heater core 6 through the cooling water circuit. The air conditioning device 24 is provided with the blower motor 18, which delivers air to the heater core 6 in order to generate hot air for heating the passenger compartment. The blower motor 18 is actuated on the basis of the power supply from the battery 28 that feeds the electric power to the motor generator 22. The electronic control device 20 performs EV travel of the vehicle by setting the internal combustion engine 2 to the stop state and driving the motor generator 22 and restarts the internal combustion engine 2 if the cooling water temperature THW becomes equal to or less than the predetermined temperature THWth during the EV travel. Further, the electronic control device 20 controlling the blower motor 18 and the seat heater 26 in correspondence with the heating request reduces the heating degree by the air conditioning device 24 and increases the heating degree by the seat heater 26, in the case of EV travel in comparison with non-EV travel, when a heating request is output to make the air conditioning device 24 heat the passenger compartment during vehicle travel. Accordingly, it is possible to suppress the temperature reduction of the cooling water of the internal combustion engine 2, which is the heat source of the air conditioning device 24. Accordingly, it is possible to increase the time until the cooling water temperature THW becomes equal to or less than the predetermined temperature THWth during EV travel, that is, it is possible to increase the duration of EV travel. Further, the heating degree by the seat heater 26 is increased in conjunction with the reduction of the heating degree by the air conditioning device 24. Accordingly, it is possible to adequately reduce the difficulty of heating the passenger compartment due to the reduction of the heating degree by the air conditioning device 24. Accordingly, it is possible to increase the duration of EV travel while adequately maintaining the heating of the passenger compartment through the setting of the heating degrees of the air conditioning device 24 and the seat heater 26.

(2) The electronic control device 20 sets the heating degree by the air conditioning device 24 and the heating degree by the seat heater 26 such that the sum of the amounts of the electric power consumption by the air conditioning device 24 and the seat heater 26 does not increase during EV travel in comparison with non-EV travel. Specifically, the sum of the amounts of the electronic power consumption by the air conditioning device 24 and the seat heater 26 becomes the same between the case of EV travel and non-EV travel. Accordingly, the amount of the electric power consumption is not increased on the basis of the execution of the control. Since it is possible to inhibit the amount of the consumption of the electric power of the battery 28 as mentioned above, it is possible to adequately increase the duration of EV travel.

(3) The electronic control device 20 gradually changes both of the heating degree by the air conditioning device 24 and the heating degree by the seat heater 26. If the heating degree by the air conditioning device 24 or the heating degree by the seat heater 26 is rapidly changed, the occupant may feel a disturbing sensation. In this regard, in accordance with the embodiment mentioned above, since both of the heating degree by the air conditioning device 24 and the heating degree by the seat heater 26 are changed gradually, it is possible to limit a disturbing sensation experienced by the occupant as a result of the change of the heating degrees of the air conditioning device 24 and the seat heater 26.

Second Embodiment

A description will be in detail given below of a second embodiment that embodies the control device for a vehicle in accordance with the present invention with reference to FIGS. 5 and 6.

The first embodiment is configured such that the heating of the passenger compartment is carried out by both of the air conditioning device 24 and the seat heater 26 by setting the output Psh of the blower motor 18 to a value that is larger than "0" when the heating request is output to make the air conditioning device 24 perform heating during EV travel. In contrast, the present embodiment is different from the first embodiment mentioned above in a point that the output Psh of the blower motor 18 is set to "0", that is, the heating of the passenger compartment by the air conditioning device 24 is inhibited.

A description will be given below centering on the different point from the first embodiment.

Figure 5:
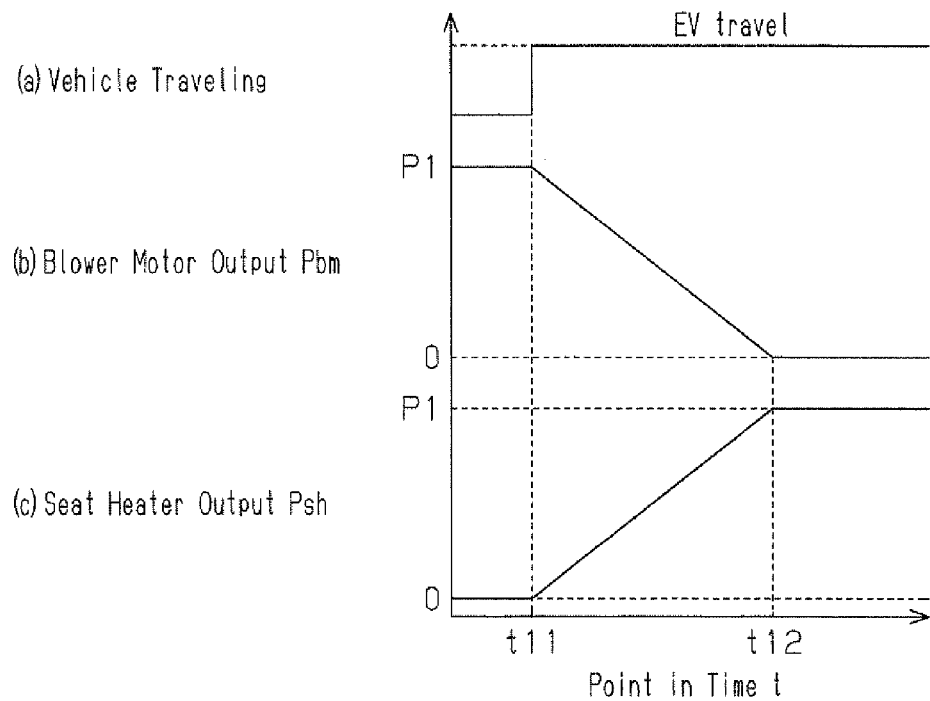
FIG. 5 is a timing chart showing an example of the transition of the output of the blower motor and the output of the seat heater during EV travel, in a second embodiment of the control device for a vehicle in accordance with the present invention.
Figure 6:
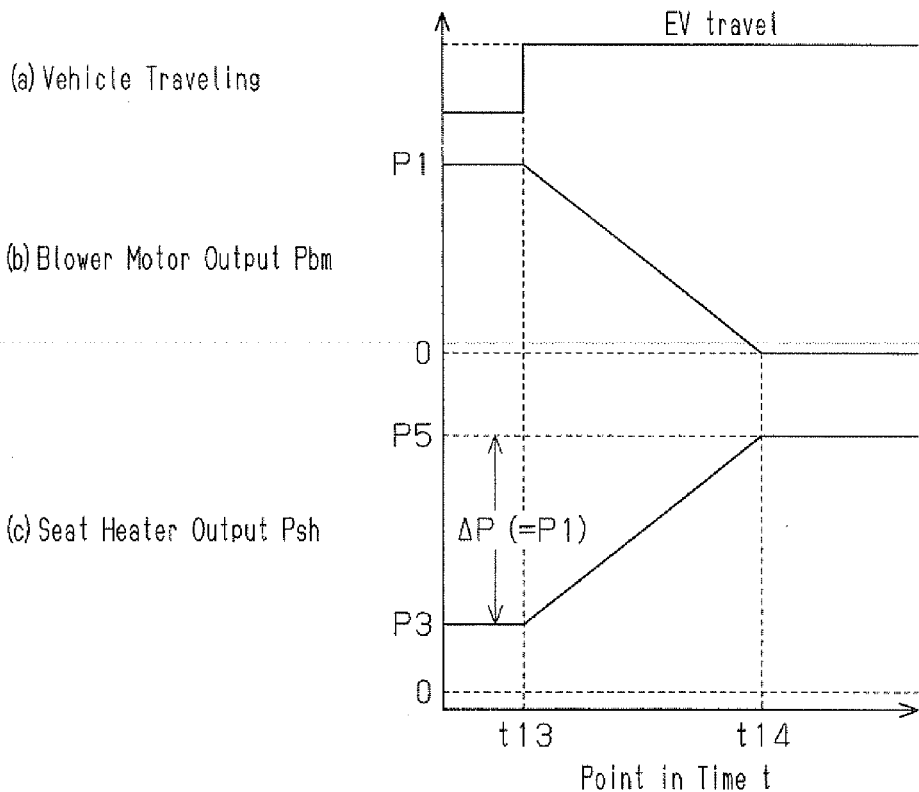
FIG. 6 is a timing chart showing an example of the transition of the output of the blower motor and the output of the seat heater during EV travel in the second embodiment.

FIGS. 5 and 6 are timing charts for describing an example of a transition of the output Pbm of the blower motor 18 and the output Psh of the seat heater 26 during EV travel. FIGS. 5 and 6 both show an example of a case where the switch of the air conditioning device 24 is "ON" before EV travel is started. Further, FIG. 5 shows an example of a case where the switch of the seat heater 26 is set to "OFF" until EV travel is started. Further, FIG. 6 shows an example of a case where the switch of the seat heater 26 is "ON" before EV travel is started.

As shown in FIG. 5, if EV travel of the vehicle is started at a point in time t11 in a state in which the output Pbm of the blower motor 18 is set to P1 and the output Psh of the seat heater 26 is set to "0" (FIGS. 5(b) and 5(c)), the output Pbm of the blower motor 18 is gradually reduced and is set to "0" at a point in time t12. Further, the output Psh of the seat heater 26 is made gradually increased from the point in time t1 and is set to P1 at the point in time t2.

As shown in FIG. 6, if EV travel of the vehicle is started at a point in time t13 in a state in which the output Pbm of the blower motor 18 is set to P1, and the output Psh of the seat heater 26 is set to P3 (>0) (FIGS. 6(b) and 6(c)), the output Pbm of the blower motor 18 is gradually decreased and is set to 0 at a point in time t14. Further, the output Psh of the seat heater 26 is gradually increased from the point in time t13 and is set to P5, which is larger by ΔP (ΔP=P1) than P3 at the point in time t4.

In accordance with the control device for a vehicle on the basis of the present embodiment described above, the following advantages can be obtained, in addition to the advantages (1) to (3) of the first embodiment.

(4) The electronic control device 20 inhibits the heating of the passenger compartment by the air conditioning device 24 at a time when a heating request is output to heat the passenger compartment during EV travel of the vehicle. Accordingly, it is possible to prevent the temperature of the cooling water of the internal combustion engine 2 from being lowered on the basis of the actuation of the air conditioning device 24. Accordingly, it is possible to further delay the time until the cooling water temperature THW becomes equal to or less than the predetermined temperature THWth during EV travel, that is, it is possible to increase the duration of EV travel.

Third Embodiment

Figure 7:
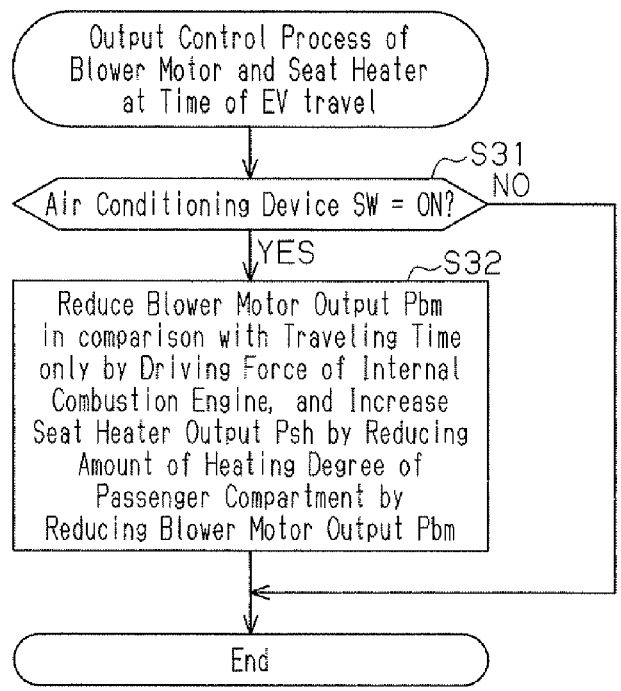
FIG. 7 is a flowchart showing a process for setting the output of the blower motor and the output of the seat heater, in a third embodiment of the control device for a vehicle in accordance with the present invention.

A description will be in detail given below of a third embodiment that embodies the control device for a vehicle in accordance with the present invention, with reference to FIG. 7.

The first and second embodiments are configured such that the heating degree by the air conditioning device 24 and the heating degree of the seat heater 26 are set such that the summation of the amounts of the electric power consumption by the air conditioning device 24 and the seat heater 26 is not increased in the case of EV travel in comparison with non-EV travel, specifically, the sum of the amounts of the electric power consumption by the air conditioning device 24 and the seat heater 26 becomes the same between the case of EV travel and non-EV travel. In contrast, the present embodiment is different from the first and second embodiments in that the heating degree by the air conditioning device 24 and the heating degree by the seat heater 26 are set such that the heating degree of the passenger compartment by both of the air conditioning device 24 and the seat heater 26 becomes the same between EV travel and non-EV travel.

A description will be given below centering on the different point from the first and second embodiments.

If the heating degree of the passenger compartment is widely changed as the result of carrying out the control for increasing the heating degree by the seat heater 26 and reducing the heating degree by the air conditioning device 24, the occupant may feel a disturbing sensation.

Accordingly, the present embodiment is configured to limit a disturbing sensation experienced by the occupant on the basis of the execution of the setting control, by preventing the heating degree from being changed between times prior to the execution of the setting control and after the execution, by setting the heating degree by the air conditioning device 24 and the heating degree by the seat heater 26 in accordance with the aspect mentioned above.

Next, a description will be given of a process for setting the output Pbm of the blower motor 18 and the output Psh of the seat heater 26 in the present embodiment, with reference to FIG. 7. FIG. 7 is a flowchart showing a setting process, which is periodically executed repeatedly by the electronic control device 20 during EV travel.

As shown in the same drawing, when the present process is started, the electronic control device 20 first determines in step S31 whether or not the switch of the air conditioning device 24 is "ON". In the case where the switch of the air conditioning device 24 is "ON" ("YES" in step S31), the process proceeds to step S32, and the output Pbm of the blower motor 18 is set to a value that is set by the switch of the air conditioning device 24, that is, a value that is reduced by a first predetermined value from a value that is set at a time when the vehicle travels on the basis of only the driving force of the internal combustion engine 2. In this case, the first predetermined value is set to be a value that is smaller than the current output Pbm of the blower motor 18, whereby the output Pbm of the blower motor 18 after the reduction is set to a value that is larger than "0". In other words, the actuation of the blower motor 18 is not stopped by the reduction of the output Pbm. Further, the output Psh of the seat heater 26 is set to a value that is set by the switch of the seat heater 26, that is, a value that is increased by a second predetermined value from the value that is set at a time when the vehicle travels on the basis of only the driving force of the internal combustion engine 2. The second predetermined value is set to a value that can be compensated by the increase of the heating degree by the seat heater 26 by such a degree that the heating degree of the passenger compartment is lowered by the reduction of the output Pbm of the blower motor 18 and is set with reference to a map. The map defining a relationship between the first predetermined value and the second predetermined value is set previously in accordance with experimentation or simulation. As mentioned above, the present embodiment is configured such that the heating degree of the passenger compartment by both of the air conditioning device 24 and the seat heater 26 becomes the same between the case of EV travel and non-EV travel. If the output Pbm of the blower motor 18 and the output Psh of the seat heater 26 are set as mentioned above, the series of processes are once finished.

In the case where the switch of the air conditioning device 24 is "OFF" in step S31 ("NO" in step S31), the temperature reduction of the cooling water is not promoted on the basis of the actuation of the blower motor 18. Accordingly, the series of processes are once finished.

In accordance with the control device for a vehicle on the basis of the present embodiment described above, the following advantages can be obtained, in addition to the advantages (1) and (3) of the first embodiment.

(5) The electronic control device 20 increases the heating degree by the seat heater 26 as well as reducing the heating degree by the air conditioning device 24 in the case of EV travel in comparison with non-EV travel, at a time when a heating request is output to make the air conditioning device 24 heat the passenger compartment during vehicle travel. Specifically, the heating degree by the air conditioning device 24 and the heating degree by the seat heater 26 are set such that the heating degree of the passenger compartment by both of the air conditioning device 24 and the seat heater 26 are the same between the case of EV travel and non-EV travel. Accordingly, since the heating degree of the passenger compartment is not changed between before the execution of the control for setting the heating degree by the air conditioning device 24 and the heating degree by the seat heater 26 and after the execution, it is possible to limit a disturbing sensation experienced by the occupant on the basis of the execution of the control.

Fourth Embodiment

A description will be in detail given below of a fourth embodiment that embodies the control device for a vehicle in accordance with the present invention, with reference to FIGS. 8 and 9. The present embodiment is different from the first to third embodiments in that the heating degree by the air conditioning device 24 is increased and the heating degree by the seat heater 26 is reduced, when the cooling water temperature THW is higher in comparison with the case where it is lower, when the heating request is output to make the seat heater 26 heat the passenger compartment during EV travel of the vehicle.

A description will be given below centering on the different point from the first to third embodiments.

The present embodiment is configured to increase the heating degree by the air conditioning device 24 and to reduce the heating degree by the seat heater 26, when the cooling water temperature THW is higher than a reference temperature α, which is higher than the predetermined temperature THWth, in comparison with the case where it is lower, when the heating request is output to make the seat heater 26 heat the passenger compartment during EV travel of the vehicle.

Next, a description will be given of a process for setting the output Pbm of the blower motor 18 and the output Psh of the seat heater 26 in accordance with the present embodiment, with reference to FIG. 8. FIG. 8 is a flowchart showing a procedure of the setting process, and is periodically repeatedly executed by the electronic control device 20 during EV travel.

As shown in the same drawing, when the present process is started, the electronic control device 20 first determines in step S41 whether or not the switch of the seat heater 26 is "ON". In the case where the switch of the seat heater 26 is "ON" ("YES" in step S41), the process proceeds to step S42, and it is determined whether or not a mode giving priority to a saving of the amount of the fuel consumption, that is, a fuel efficiency priority mode is selected as the combustion mode of the internal combustion engine 2. In the case where the fuel efficiency priority mode is selected ("YES" in step S42), the process proceeds to step S43, and it is determined whether or not the cooling water temperature THW is higher than the reference temperature α. As a result, in the case where the cooling water temperature THW is higher than the reference temperature α ("YES" in step S43), the process proceeds to step S44, and the switch of the seat heater 26 to is set to "OFF". In other words, the heating of the passenger compartment by the seat heater 26 is inhibited. Further, at this time, the output Pbm of the blower motor 18 is increased. Specifically, in the case where the switch of the air conditioning device 24 is set to "OFF", the heating by the air conditioning device 24 is carried out by actuating the blower motor 18. Further, at this time, in the case where the switch of the air conditioning device 24 is set to "ON", the output Pbm of the blower motor 18 is made larger than the current preset value. If the output Pbm of the blower motor 18 is set as well as the switch of the seat heater 26 is set to "OFF" as mentioned above, the series of processes are once finished.

On the other hand, in the case where the cooling water temperature THW is not higher than the reference temperature α in step S43 ("NO" in step S43), the process proceeds to step S45, and the output Psh of the seat heater 26 is reduced. In other words, the output Psh of the seat heater 26 is set to a value that is smaller than the current value and larger than "0". Further, at this time, the output Pbm of the blower motor 18 is set to the current preset value. In other words, in the case where the switch of the air conditioning device 24 has been set to "OFF" till then, the air conditioning device 24 is continuously maintained in the actuation stop state. Further, in the case where the switch of the air conditioning device 24 has been set to "ON" till then, the output Pbm of the blower motor 18 is continuously set to the current preset value. If the output Psh of the seat heater 26 and the output Pbm of the blower motor 18 are set as mentioned above, the series of processes are once finished.

On the other hand, in the case where the fuel efficiency priority mode is not selected in step S42 ("NO" in step S42), that is, in the case where a normal mode is selected, the process proceeds to step S46, and it is determined whether or not the cooling water temperature THW is higher than the reference temperature α. As a result, in the case where the cooling water temperature THW is higher than the reference temperature α ("YES" in step S46), the process proceeds to step S47, and the output Psh of the seat heater 26 is reduced. In other words, the output Psh of the seat heater 26 is set to a value that is smaller than the current value and larger than "0". Further, at this time, the output Pbm of the blower motor 18 is increased. In other words, in the case where the switch of the air conditioning device 24 has been set to "OFF" till then, the blower motor 18 is actuated. Further, when the switch of the air conditioning device 24 has been set to "ON" till then, the output Pbm of the blower motor 18 is made larger than the current preset value. If the output Psh of the seat heater 26 and the output Pbm of the blower motor 18 are set as mentioned above, the series of processes are once finished.

On the other hand, in the case where the cooling water temperature THW is not higher than the reference temperature α in step S46 ("NO" in step S46), the process proceeds to step S48, and the output Psh of the seat heater 26 is set to the current preset value. Further, at this time, the output Pbm of the blower motor 18 is set to the current preset value. In other words, in the case where the switch of the air conditioning device 24 is set to "OFF", the air conditioning device 24 is continuously maintained in the actuation stop state. Further, when the air conditioning device 24 has been set to "ON" till then, the output Pbm of the blower motor 18 is continuously set to the current preset value. If the output Psh of the seat heater 26 and the output Pbm of the blower motor 18 are set as mentioned above, the series of processes are once finished.

FIG. 9 is a table that brings together a relationship between the combustion mode (the normal mode and the fuel efficiency priority mode) of the internal combustion engine 2 mentioned above, the level of the cooling water temperature, and the output Psh of the seat heater 26 and the output Pbm of the blower motor 18.

In accordance with the control device for a vehicle on the basis of the present embodiment described above, the following advantages shown in items (6) to (8) can be obtained.

(6) The vehicle is provided with the internal combustion engine 2 for driving the vehicle, the motor generator 22 for driving the vehicle on the basis of the power supply from the battery 28, the air conditioning device 24 that heats up the passenger compartment by using the cooling water passing through the internal combustion engine 2 as the heat source, and the seat heater 26 that heats up the passenger compartment by using the power supply from the battery 28 as the heat source. The cooling water circulates in the inner portion of the internal combustion engine 2 and the heater core 6 through the cooling water circuit, and the air conditioning device 24 is provided with the blower motor 18 that delivers air to the heater core 6 in order to generate hot air for heating the passenger compartment. The blower motor 18 is actuated on the basis of the power supply from the battery 28 that feeds the electric power to the motor generator 22. The electronic control device 20 carries out EV travel of the vehicle by setting the internal combustion engine 2 to the stop state and driving the motor generator 22, and restarts the internal combustion engine 2 if the cooling water temperature THW becomes equal to or less than the predetermined temperature THWth during EV travel. Further, the electronic control device 20 reduces the heating degree by the seat heater 26 and increases the heating degree by the air conditioning device 24, in the case where the cooling water temperature THW is relatively high, in comparison with the case where it is relatively low, when the heating request is output to make the seat heater 26 heat the passenger compartment during EV travel of the vehicle. Specifically, the electronic control device 20 reduces the heating degree by the seat heater 26 and increases the heating degree by the air conditioning device 24, when the cooling water temperature THW is higher than the reference temperature α, which that is higher than the predetermined temperature THWth, in comparison with the case where is it lower than the reference temperature α. Accordingly, since it is possible to reduce the electric power that is consumed from the battery 28 on the basis of the actuation of the seat heater 26, it is possible to increase the duration of EV travel. Further, in conjunction with the reduction of the heating degree by the seat heater 26, the heating degree by the air conditioning device 24 is increased in the case where the cooling water temperature THW is higher than the reference temperature α in comparison with the case where it is lower. Accordingly, it is possible to inhibit the passenger compartment from becoming hard to be heated on the basis of the reduction of the heating degree by the seat heater 26. Further, since the heating degree by the air conditioning device 24 using the cooling water of the internal combustion engine 2 as the heat source is made smaller in the case where the cooling water temperature THW is lower than the reference temperature α in comparison with the case where it is higher, it is possible to adequately inhibit the cooling water temperature from being excessively lowered. Accordingly, it is possible to inhibit the time until the cooling water temperature THW becomes equal to or less than the predetermined temperature THWth during EV travel, that is, the duration of EV travel from becoming short. Therefore, it is possible to increase the duration of EV travel while adequately maintaining the heating of the passenger compartment through the setting of the heating degree by the air conditioning device 24 and the seat heater 26.

(7) In comparison with the normal mode, the electronic control device 20 further reduces the heating degree by the seat heater 26 that is set in correspondence to the cooling water temperature TRW, in the case where the fuel efficiency priority mode is selected as the combustion mode of the internal combustion engine 2. Accordingly, since it is possible to further reduce the electric power that is consumed from the battery 28 on the basis of the actuation of the seat heater 26, it is possible to further increase the duration of EV travel. The occupant may feel disturbed on the basis of the reduction of the heating degree by the seat heater 26. However, since the control for setting the heating degree by the seat heater 26 is carried out in the case where the driver positively selects the fuel efficiency priority mode as the combustion mode of the internal combustion engine 2, the disturbing feel becomes easier to tolerate for the occupant.

(8) The electronic control device 20 inhibits the heating of the passenger compartment by the seat heater 26 in the case where the cooling water temperature THW is higher than the reference temperature α that is higher than the predetermined temperature THWth, under the case where the fuel efficiency priority mode is selected as the combustion mode of the internal combustion engine 2. Accordingly, the electric power is not consumed from the battery 28 on the basis of the actuation of the seat heater 26. Accordingly, it is possible to further increase the duration of EV travel.

Fifth Embodiment

A description will be in detail given below of a fifth embodiment that embodies the control device for a vehicle in accordance with the present invention, with reference to FIGS. 10 and 11. The present embodiment is different from the first to fourth embodiments in a point that the heating degree by the seat heater 26 is lowered when the charging state SOC of the battery 28 is relatively high, in comparison with the case where it is relatively high, when a heating request is output to make the seat heater 26 heat the passenger compartment during EV travel of the vehicle.

A description will be given below centering on the different point from the first to fourth embodiments.

The present embodiment reduces the heating degree by the seat heater 26 in the case where the charging state SOC of the battery 28 is lower than a predetermined state β in comparison with the case where it is lower, at a time when the heating request is output to make the seat heater 26 carry out the heating of the passenger compartment during EV travel of the vehicle. The predetermined state β is set to a value that is larger than a lower limit value of the charging state SOC of the battery 28 that is set to an execution permitting condition of EV travel. The predetermined state β is previously set through an experiment, a simulation or the like.

Next, a description will be given of a process for setting the output Pbm of the blower motor 18 and the output Psh of the seat heater 26 in accordance with the present embodiment. FIG. 10 is a flowchart showing a procedure of the setting process, and is periodically repeatedly executed by the electronic control device 20 during EV travel.

As shown in the same drawing, when the present process is started, the electronic control device 20 first determines in step S51 whether or not the switch of the seat heater 26 is "ON". In the case where the switch of the seat heater 26 is "ON" ("YES" in step S51), the process proceeds to step S52, and it is determined whether or not the fuel efficiency priority mode is selected as the combustion mode of the internal combustion engine 2. In the case where the fuel efficiency priority mode is selected ("YES" in step S52), the process proceeds to step S53, and it is determined whether or not the charging state SOC of the battery 28 is lower than the predetermined state β. As a result, in the case where the charging state SOC of the battery 28 is lower than the predetermined state β ("YES" in step S53), the process proceeds to step S54, and the switch of the seat heater 26 is set to "OFF". In other words, the heating of the passenger compartment by the seat heater 26 is inhibited. If the switch of the seat heater 26 is set to "OFF" as mentioned above, the series of processes are once finished.

On the other hand, in the case where the charging state SOC of the battery 28 is not lower than the predetermined state β in step S53 ("NO" in step S53), the process proceeds to step S55, and the output Psh of the seat heater 26 is reduced. In other words, the output Psh of the seat heater 26 is set to a value that is smaller than the current value and is larger than "0". If the output Psh of the seat heater 26 is set as mentioned above, the series of processes are once finished.

On the other hand, in the case where the fuel efficiency priority mode is not selected in step S52 ("NO" in step S52), that is, in the case where the normal mode is selected, the process proceeds to step S56, and it is determined whether or not the charging state SOC of the battery 28 is lower than the predetermined state β. As a result, in the case where the charging state SOC of the battery 28 is lower than the predetermined state β ("YES" in step S56), the process proceeds to step S57, and the output Psh of the seat heater 26 is reduced. In other words, it carries out the same process as the previous step S55, and the series of processes are once finished.

On the other hand, in the case where the charging state SOC of the battery 28 is not lower than the predetermined state β in step S56 ("NO" in step S56), the process proceeds to step S58, and the output Psh of the seat heater 26 is set to the current preset value. If the output Psh of the seat heater 26 is set as mentioned above, the series of processes are once finished.

Figures 11, 12:
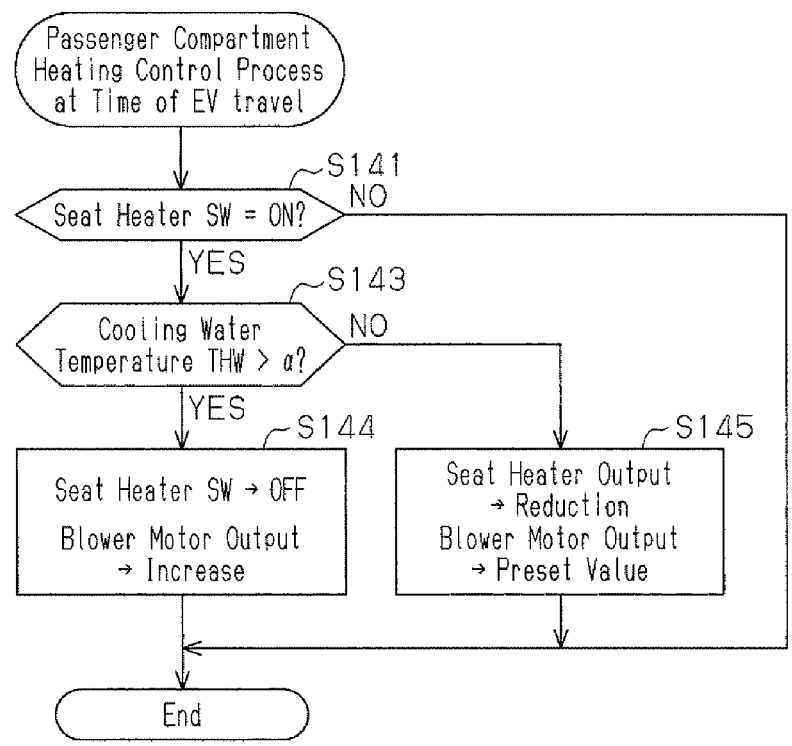
FIG. 11 is a table showing a relationship between the combustion mode of the internal combustion engine, a level of a charging state of a battery, and the output of the seat heater, in the fifth embodiment.
FIG. 12 is a flowchart showing a process for setting the output of the blower motor and the output of the seat heater, in a modified example of the fourth embodiment.

FIG. 11 is a table that brings together a relationship between the combustion mode (the normal mode and the fuel efficiency priority mode) of the internal combustion engine 2 mentioned above and the level of the charging state SOC of the battery 28, and the output Psh of the seat heater 26.

The seat heater 26 in accordance with the present embodiment corresponds to the heating device in accordance with the present invention.

In accordance with the control device for a vehicle on the basis of the present embodiment described above, the following advantages shown in items (9) to (11) can be obtained.

(9) The vehicle is provided with the internal combustion engine 2 for driving the vehicle, the motor generator 22 for driving the vehicle on the basis of the power supply from the battery 28, and the seat heater 26 that heats up the passenger compartment by using the power supply from the battery 28 as the heat source. The electronic control device 20 carries out EV travel of the vehicle by driving the motor generator 22 as well as setting the internal combustion engine 2 to the stop state. Further, the heating degree by the seat heater 26 is reduced in the case where the charging state SOC of the battery 28 is lower in comparison with the case where it is higher, at a time when the heating request is output to make the seat heater 26 carry out the heating of the passenger compartment during EV travel of the vehicle. Specifically, the heating degree by the seat heater 26 is reduced in the case where the charging state SOC of the battery 28 is lower than the predetermined state β in comparison with the case where it is higher. Accordingly, the electric power consumed from the battery 28 is reduced by reducing the heating degree by the seat heater 26 in the case where the charging state SOC of the battery 28 is lower than the predetermined state β. Accordingly, it is possible to increase the duration of EV travel. Further, the heating degree of the passenger compartment can be maintained to some extent by not reducing the heating degree by the seat heater 26 or making the reducing degree small in the case where the charging state SOC of the battery 28 is higher than the predetermined state β. Accordingly, it is possible to maintain the heating degree of the passenger compartment high, while maintaining the duration of EV travel long. Therefore, it is possible to increase the duration of EV travel while adequately maintaining the heating of the passenger compartment through the setting of the heating degree by the seat heater 26.

(10) The electronic control device 20 reduces the heating degree by the seat heater 26 that is set in correspondence to the charging state SOC of the battery 28 in the case where the fuel efficiency priority mode is selected as the combustion mode of the internal combustion engine 2 in comparison with the case where the normal mode is selected. Accordingly, since it is possible to further reduce the electric power that is consumed from the battery 28 on the basis of the actuation of the seat heater 26, it is possible to further increase the duration of EV travel. In this case, the occupant may feel disturbed by reducing the heating degree by the seat heater 26. However, since the control for setting the heating degree by the seat heater 26 is carried out in the case where the driver positively selects the fuel efficiency priority mode as the combustion mode of the internal combustion engine 2, the disturbing feel becomes easier to tolerate for the occupant.

(11) The electronic control device 20 inhibits the heating of the passenger compartment by the seat heater 26 in the case where the charging state SOC of the battery 28 is lower than the predetermined state β, under the case where the fuel efficiency priority mode is selected as the combustion mode of the internal combustion engine 2. Accordingly, the electric power is not consumed from the battery 28 on the basis of the actuation of the seat heater 26. Accordingly, it is possible to further increase the duration of EV travel.

The control device for a vehicle in accordance with the present invention is not limited to the structures that are exemplified by the embodiment mentioned above, but may be executed, for example, as the following aspects that are obtained by appropriately modifying them.

The fourth and fifth embodiments are configured to determine whether or not the fuel efficiency priority mode is selected as the combustion mode of the internal combustion engine 2, and set the output Psh of the seat heater 26 and the output Pbm of the blower motor 18 in correspondence to the result of determination. However, the combustion mode of the internal combustion engine 2 is not an essential parameter for setting the output Psh of the seat heater 26 and the output Pbm of the blower motor 18. In addition, for example, as shown in FIGS. 12 and 13, the output Psh of the seat heater 26 and the output Pbm of the blower motor 18 may be set regardless of the combustion mode of the internal combustion engine 2. FIG. 12 is a flowchart that corresponds to FIG. 8, and corresponding processes in FIG. 12 to the processes (S41 to S45) in FIG. 8 are denoted by step numbers "S141 to S145" obtained by adding "100" thereto. Further, FIG. 13 is a flowchart that corresponds to FIG. 10, and corresponding processes in FIG. 13 to the processes (S51 to S55) in FIG. 10 are denoted by step numbers "S151 to S155" obtained by adding "100" thereto.

The fourth embodiment is exemplified by the air conditioning device 24 having the cooling water of the internal combustion engine 2 as the heat source. However, the main heating device in accordance with the present invention is not limited to this. As long as it heats up the passenger compartment by using an exhaust heat output from the vehicle as the heat source, it may be structured to heat up the passenger compartment by introducing, into the passenger compartment, the heat that is discharged from the battery 28, the inverter or the motor generator 22, or the heat that is recovered by the exhaust heat recovery device 8 of the internal combustion engine during EV travel of the vehicle. Further, it may be structured to temporarily store the heat that is discharged from the battery 28, the inverter or the motor generator 22, or the heat that is recovered by the exhaust heat recovery device 8 of the internal combustion engine in a heat storage medium, and introduce the heat stored in the heat storage medium into the passenger compartment. Further, it may be structured to store the heat supplied from the heater using the electric power fed from the battery as the heat source in the heat storage medium in the case where the vehicle is not under EV travel. Even in this case, as in the fourth embodiment, the heating degree by the seat heater 26 may be reduced and the heating degree by the main heating device may be increased in the case where the temperature of the heat source of the main heating device is higher in comparison with the case where it is lower, at a time when the heating request is output to make the seat heater 26 carry out the heating of the passenger compartment during EV travel of the vehicle. Accordingly, it is possible to achieve the advantages that are similar the advantages of the fourth embodiment.

In each of the embodiments mentioned above, the auxiliary heating device or the heating device is exemplified by the structure that is embodied as the seat heater 26. However, the auxiliary heating device or the heating device is not limited to this. As long as it may heat up the passenger compartment by using the power supply from the battery 28 as the heat source, for example, it can be embodied as a heater heating a steering wheel, a heater heating an indoor wall, or a air heating heater heating the air in the passenger compartment.

The first to third embodiments are configured such that the output Psh of the seat heater 26 is increased unconditionally in the case of EV travel in comparison with non-EV travel, at a time when the heating request is output to make the air conditioning device 24 carry out the heating of the passenger compartment during the vehicle traveling. However, the present invention is not limited to this. For adequately elongating the duration of EV travel while increasing the output Psh of the seat heater 26, it is necessary to take into consideration the matter that the charging state of the battery 28 is excessively lowered on the basis of the output increase of the seat heater 26 and it is impossible to continue EV travel accordingly. For example, the output Psh of the seat heater 26 may be increased only in the case where the charging state SOC of the battery 28 is sufficiently high. Further, the amount of increase of the output Psh of the seat heater 26 may be made smaller in accordance that the charging state SOC of the battery 28 is lower.

The first and second embodiments are configured such that the summation of the amounts of the electric power consumption by the air conditioning device 24 and the seat heater 26 is the same between the case of EV travel and non-EV travel. However, in place of this, the heating degree by the air conditioning device 24 and the heating degree by the seat heater 26 may be set such that the summation of the amounts of the electric power consumption by the air conditioning device 24 and the seat heater 26 is reduced in the case of EV travel in comparison with non-EV travel. In this case, since it is possible to reduce the electric power of the battery 28 that is consumed by the air conditioning device 24 and the seat heater 26, and it is possible to suppress the reduction of the charging state SOC of the battery 28, it is possible to further increase the duration of EV travel.

The first to third embodiments are configured to increase the heating degree by the auxiliary heating device as well as reducing the heating degree by the main heating device in the case of EV travel in comparison with non-EV travel, at a time when the heating request is output to make the main heating device carry out the heating of the passenger compartment during the vehicle traveling. However, the control device for a vehicle in accordance with the present invention is not limited to this, but may be structured such that the heating degree by the auxiliary heating device is not increased. In short, the heating of the passenger compartment may be carried out by the auxiliary heating device as well as the heating degree by the main heating device is reduced in the case of EV travel in comparison with non-EV travel, at a time when the heating request is output to make the main heating device carry out the heating of the passenger compartment during the vehicle traveling.

DESCRIPTION OF REFERENCE NUMERALS

2 . . . Internal Combustion Engine, 4 . . . Motor-Driven Water Pump, 6 . . . Heater Core, 8 . . . Exhaust Heat Recovery Device, 10 . . . EGR Cooler, 12 . . . Throttle Body, 14 . . . Radiator, 16 . . . Thermostat, 18 . . . Blower Motor, 20 . . . Electronic Control Device, 22 . . . Motor Generator, 24 . . . Air Conditioning Device, 26 . . . Seat Heater, 28 . . . Battery.

The invention claimed is:

1. A vehicle comprising:
an internal combustion engine for driving the vehicle;
a motor for driving the vehicle;
a main heating device for heating a passenger compartment by using cooling water passing through the internal combustion engine as a heat source;
an auxiliary heating device for heating the passenger compartment by using a power supply from a battery as a heat source;
a driving control portion for performing electric vehicle (EV) travel of the vehicle by driving the motor while setting the internal combustion engine to a stop state and restarting the internal combustion engine as a temperature of the cooling water becomes equal to or less than a predetermined temperature during EV travel; and
a heating control portion for controlling the main heating device and the auxiliary heating device in correspondence with a heating request, wherein, when the heating request is output to make the main heating device heat the passenger compartment during travel of the vehicle, the heating control portion reduces a heating degree by the main heating device during EV travel in comparison with non-EV travel and causes the auxiliary heating device to heat the passenger compartment.

2. The vehicle according to claim 1, wherein, when the heating request is output to make the main heating device heat the passenger compartment during the vehicle travel, the heating control portion reduces the heating degree by the main heating device and increases the heating degree by the auxiliary heating device, in the case of EV travel in comparison with non-EV travel.

3. The vehicle according to claim 2, wherein the heating control portion sets the heating degree by the main heating device and the heating degree by the auxiliary heating device such that the heating degrees of the passenger compartment by both of the main heating device and the auxiliary heating device are the same between EV travel and non-EV travel.

4. The vehicle according to claim 2, wherein
the cooling water circulates in an inner portion of the internal combustion engine and a heater core through a cooling water circuit,
the main heating device is an air conditioning device provided with a blower motor that delivers air to the heater core to generate hot air for heating the passenger compartment,
the blower motor is actuated on the basis of a power supply from the battery that feeds electric power to the motor, and
the heating control portion sets the heating degree by the main heating device and the heating degree by the auxiliary heating device to prevent a summation of amounts of electric power consumption of the main heating device and the auxiliary heating device from being increased during EV travel in comparison with non-EV travel.

5. The vehicle according to claim 1, wherein the heating control portion inhibits the heating of the passenger compartment by the main heating device when the heating request is output during EV travel of the vehicle.

6. The vehicle according to claim 1, wherein
the cooling water circulates in an inner portion of the internal combustion engine and a heater core through a cooling water circuit, and
the main heating device is an air conditioning device provided with a blower motor that delivers air to the heater core to generate hot air for heating the passenger compartment.

7. The vehicle according to claim 1, wherein the auxiliary heating device is constructed by at least one of a seat heater heating a vehicle seat, a steering heater for heating a steering wheel, a wall heater for heating an interior wall, and an air heater for heating air in the passenger compartment.

8. The vehicle according to claim 1, wherein the heating control portion changes at least one of the heating degree by the main heating device and the heating degree by the auxiliary heating device gradually.

9. A vehicle comprising:
an internal combustion engine for driving the vehicle;
a motor driving the vehicle on the basis of a power supply from a battery;
a main heating device for heating a passenger compartment by using cooling water passing through the internal combustion engine as a heat source;

an auxiliary heating device for heating the passenger compartment by using the power supply from the battery as a heat source;

a driving control portion for performing electric vehicle (EV) travel of the vehicle by driving the motor while setting the internal combustion engine to a stop state and restarting the internal combustion engine as a temperature of the cooling water becomes equal to or less than a predetermined temperature during EV travel; and a heating control portion for controlling the main heating device and the auxiliary heating device in correspondence with a heating request, wherein, when the heating request is output to make the auxiliary heating device perform heating of the passenger compartment during EV travel of the vehicle, the heating control portion reduces a heating degree of the auxiliary heating device and increases a heating degree of the main heating device when a temperature of the cooling water is relatively high, in comparison with a case in which the temperature of the cooling water is relatively low.

10. The vehicle according to claim 9, wherein the heating control portion reduces the heating degree of the auxiliary heating device and increases the heating degree of the main heating device when the temperature of the cooling water is higher than a reference temperature, which is higher than the predetermined temperature, in comparison with the case where the temperature of the cooling water is lower than the reference temperature.

11. The vehicle according to claim 9, wherein, when a mode giving priority to saving of an amount of fuel consumption is selected as a combustion mode of the internal combustion engine, the heating control portion further reduces the heating degree by the auxiliary heating device, which is set in correspondence with the temperature of the cooling water, in comparison with the case where other combustion mode is selected.

12. The vehicle according to claim 9, wherein the heating control portion inhibits the heating of the passenger compartment by the auxiliary heating device when the temperature of the cooling water is higher than a reference temperature, which is higher than the predetermined temperature.

13. The vehicle according to claim 9, wherein
the cooling water circulates in an inner portion of the internal combustion engine and a heater core through a cooling water circuit, and the main heating device is an air conditioning device provided with a blower motor that delivers air to the heater core to generate hot air for heating the passenger compartment.

14. The vehicle according to claim 9, wherein the auxiliary heating device is constructed by at least one of a seat heater heating a vehicle seat, a steering heater for heating a steering wheel, a wall heater for heating an interior wall, and an air heater for heating air in the passenger compartment.

15. The vehicle according to claim 9, wherein the heating control portion changes at least one of the heating degree by the main heating device and the heating degree by the auxiliary heating device gradually.

16. A vehicle comprising:

an internal combustion engine for driving the vehicle;

a motor driving the vehicle on the basis of a power supply from a battery;

a main heating device heating a passenger compartment by using an exhaust heat from the vehicle;

an auxiliary heating device heating the passenger compartment by using a power supply from the battery as a heat source;

a driving control portion for performing electric vehicle (EV) travel of the vehicle by driving the motor while setting the internal combustion engine to a stop state and restarting the internal combustion engine as a temperature of the internal combustion engine becomes equal to or less than a predetermined temperature during EV travel; and a heating control portion for controlling the main heating device and the auxiliary heating device in correspondence with a heating request, wherein, when the heating request is output to make the auxiliary heating device heat the passenger compartment during EV travel of the vehicle, the heating control portion reduces a heating degree by the auxiliary heating device and increases a heating degree by the main heating device when the temperature of the heat source of the main heating device is relatively high, in comparison with a case in which the temperature of the heat source of the main heating device is relatively low.

* * * * *